| 
US007414693B2

(12) United States Patent
Nam et al.

(10) Patent No.: US 7,414,693 B2
(45) Date of Patent: Aug. 19, 2008

(54) FABRICATION METHOD OF LIQUID CRYSTAL DISPLAY PANEL

(75) Inventors: Seung Hee Nam, Suwon-shi (KR); Min Joo Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 17 days.

(21) Appl. No.: 10/713,198

(22) Filed: Nov. 17, 2003

(65) Prior Publication Data

US 2004/0125309 A1     Jul. 1, 2004

(30) Foreign Application Priority Data

Dec. 30, 2002     (KR)     ............... 10-2002-0086997

(51) Int. Cl.
*G02F 1/1345*     (2006.01)
*G02F 1/1343*     (2006.01)

(52) U.S. Cl. .................. 349/149; 349/143; 349/152

(58) Field of Classification Search ............. 349/149, 349/187, 143, 43, 150, 152
See application file for complete search history.

(56) References Cited

U.S. PATENT DOCUMENTS 5,517,342 A * 5/1996 Kim et al. ............... 349/43
5,744,821 A * 4/1998 Song ............... 257/59
5,811,318 A * 9/1998 Kweon ............... 438/30
6,255,130 B1 * 7/2001 Kim ............... 438/30
6,274,886 B1 * 8/2001 Sasaki et al. ............... 257/72
6,380,559 B1 * 4/2002 Park et al. ............... 257/59
6,429,057 B1 * 8/2002 Hong et al. ............... 438/158
6,586,286 B2 * 7/2003 Park et al. ............... 438/155
6,618,110 B2 * 9/2003 Yoo et al. ............... 349/141
6,774,969 B2 * 8/2004 Ma et al. ............... 349/139

* cited by examiner

*Primary Examiner*—Mike Qi
(74) *Attorney, Agent, or Firm*—McKenna, Long & Aldridge LLP

(57) ABSTRACT

There is explained a fabrication method of a liquid crystal display panel capable of simplifying a substrate structure and a fabrication process. The fabrication method comprises the steps of: forming a thin film transistor formed at every region arranged by the intersection structure of a gate line and a data line formed on a substrate, a pixel electrode, and a substrate including a plurality of thin film transistor array substrate having a gate pad part including a gate pad connected to the gate line and a data pad part including a data pad connected to the data line; arranging a cutting-off plate on a rest region of the substrate except for the pad part; and exposing the gate pad of the pad part and the data pad protection electrode by a etching process using the cutting-off plate.

4 Claims, 22 Drawing Sheets

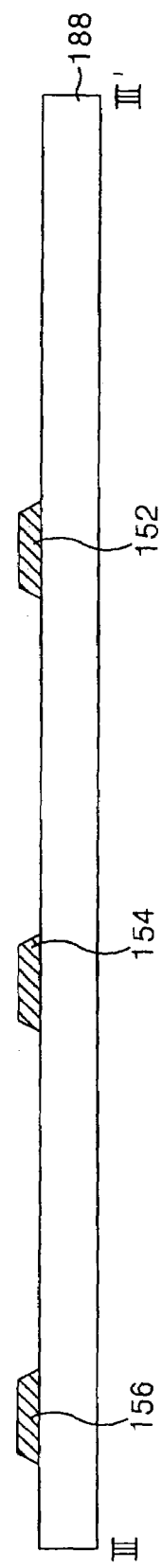

FABRICATION METHOD OF LIQUID CRYSTAL DISPLAY PANEL

This application claims the benefit of Korean Patent Application No. 10-2002-0086997, filed on Dec. 30, 2002, which is hereby incorporated by reference for all purposes as if fully set forth herein.

BACKGROUND OF THE INVENTION

1. Field of the Invention

The present invention relates to a fabrication method of a liquid crystal display panel, and more particularly to the fabrication method of the liquid crystal display panel capable of simplifying a substrate structure and a fabrication process.

2. Description of the Related Art

In general, a liquid crystal display represents an image by means of adjusting a transmittance of the liquid crystal by use of an electric field. For this purpose, the liquid crystal display comprises a liquid crystal display panel where the liquid crystal cells are arranged in a matrix pattern, and a driving circuit for driving the liquid crystal display panel.

The liquid crystal display panel comprises the thin film transistor array substrate and a color filter array substrate facing each other, a spacer located for maintaining a fixed cell gap between two substrates and a liquid crystal stuffed to the cell gap.

The thin film transistor array substrate includes gate lines and data lines, a thin film transistor formed as a switching device at every intersection of the gate lines and the data lines, a pixel electrode connected to the thin film transistor formed by the liquid crystal cell unit, and an alignment film applied on them and so on. The gate lines and the data lines are supplied with signal from driving circuits through each of the pad part. The thin film transistor responds to a scan signal supplied to the gate line, and supplies to pixel electrode a pixel voltage signal supplied to the data line.

The color filter array substrate includes a color filter formed by the liquid crystal cell unit, a black matrix for reflecting external light and separating between the color filters, a common electrode supplying a reference voltage commonly to the liquid crystal cells, and an alignment film applied on them.

The liquid crystal display panel combines the thin film transistor array substrate and the color filter array substrate. Liquid crystal is injected between substrates and the panel and is then sealed. This liquid crystal panel includes, a thin film transistor array substrate, whose manufacture requires a semiconductor process and a plurality of masking processes.

Accordingly, the manufacturing process is complicated, increasing the cost of the liquid crystal display panel. In order to solve this problem, the manufacture of the thin film transistor array substrate is improved so as to reduce the number of masking process number. The benefit is that in one masking process, there are many sub-processes such as an evaporation process, a cleaning process, a photolithography process, an etching process, a photoresist strip process and an inspection process. Recently, instead of the 5-step masking process which is the common masking process for thin film transistor array substrates, a 4-step masking process reducing one of the masking sub-processes has been developed.

FIG. 1 is a plane view illustrating the thin film transistor array substrate formed using a masking process, and FIG. 2 is a sectional view taken along line I-I' of FIG. 1 illustrating the thin film transistor array substrate as shown in FIG. 1.

The thin film transistor array substrate, as shown in FIG. 1 and FIG. 2, comprises gate lines 2 and data lines 4 crossed with each other and having a gate insulation film therebetween on a lower substrate 42, a thin film transistor 6 formed at every intersection, and a pixel electrode 18 formed in the cell region arranged in the crossed pattern. And the thin film transistor array substrate comprises a storage capacitor 20 formed at overlapped part of the pixel electrode 18 and a prior stage gate line 2, a gate pad part 26 connected to the gate line 2 and a data pad part 34 connected to the data line 4.

The thin film transistor 6 comprises a gate electrode 8 connected to the gate line 2, a source electrode 10 connected to the data line 4, a drain electrode 12 connected to a pixel electrode 18, an active layer 14 defining a channel between the source electrode 10 and the drain electrode 12 and overlapped with the gate electrode 8. The active layer 14 overlaps with the data pad 36, the storage electrode 22, the data line 4, the source electrode 10 and the drain electrode 12, and further comprises a channel part defined between the source electrode 10 and the drain electrode 12. On the active layer 14, the data pad 36, the storage electrode 22, the data line 4, the source electrode 10, the drain electrode 12 and an ohmic contact layer 48 for making an ohmic contact are further formed. The thin film transistor 6 responds to the gate signal supplied to the gate line 2 and supplies a pixel voltage signal from the data line 4 to the pixel electrode 18.

The pixel electrode 18 is connected to the drain electrode 12 of the thin film transistor 6 through a first contact hole 16 penetrating a protection film 50. The pixel electrode 18 generates a voltage difference from the common electrode formed on the upper substrate (not shown). By this voltage difference, the liquid crystal located between the thin film transistor substrate and the upper substrate rotates due to a dielectric anisotropy, and transmits incident light through the pixel electrode 18 from the light source (not shown) transmit to the upper substrate.

The storage capacitor 20 comprises a prior stage gate line 2, a storage electrode overlapped with the gate line 2 having the gate insulation film 44, the active layer 14 and the ohmic contact layer 48 therebetween, and the pixel electrode 18 connected through the second contact hole 24 formed at the protection film 50 and overlapped with the storage electrode 22 having the protection film 50 therebetween. The storage capacitor 20 maintains the pixel voltage charged to the pixel electrode 18 constant until the next pixel voltage is charged.

The gate line 2 is connected to the gate driver (not shown) through the gate pad part 26. The gate pad part 26 comprises the gate pad 28 extending from the gate line 2 and the gate pad protection electrode 32 connected to the gate pad 28 through the third contact hole 30 penetrating both of the gate insulation film 44 and the protection film 50.

The data line 4 is connected to the data driver (not shown) through the data pad part 34. The data pad part 34 comprises the data pad 36 extending from the data line 4 and the data pad protection electrode 40 connected to the data pad 36 through the fourth contact hole 38 penetrating the protection film 50.

The fabrication method of the thin film transistor substrate having this constitution is explained in full detail in FIGS. 3a to 3d using a 4-step masking process.

Referring to FIG. 3a, the gate patterns are formed on the lower substrate 42.

On the lower substrate 42, the gate metal layer is formed by an evaporation method such as sputtering. Subsequently, the gate metal layer is patterned by the photolithography process using the first mask and the etching process. In addition, the gate patterns, including the gate line 2, the gate electrode 8, and the gate pad 28 are formed. As a gate metal, a chrome (Cr), molybdenum (Mo), aluminum (Al), and so on are used in a single layer or a double layer structure.

Referring to FIG. 3b, on the lower substrate 42 where the gate pattern is formed, the gate insulation film 44, the active layer 14, the ohmic contact layer 48 and source/drain patterns are subsequently formed.

On the lower substrate 42 having the gate pattern, the gate insulation film 44, an amorphous silicon layer, a n+ amorphous silicon layer and the source/drain metal layer are subsequently formed by the evaporation method such as a PECVD, a sputtering and so on.

The photoresist pattern is formed on the source/drain metal layer by a photolithography process by the use of the second mask. In this case, by using a diffraction photo mask as a second mask having the diffraction photo part over the channel part of the thin film transistor, the photoresist pattern of the channel part has lower height than the other source/drain pattern part.

Subsequently, the source/drain metal layer is patterned by a wet etching process using the photoresist pattern and therefore the source/drain patterns including the data line 4, the source electrode 10, the drain electrode 12 combined as one body with the source electrode 10 and the storage electrode 22 are formed.

In addition, by a dry etching process using the same photoresist pattern, the n+ amorphous silicon layer and the amorphous silicon layer are patterned at the same time and therefore the ohmic contact layer 48 and the active layer 14 are formed.

The photoresist pattern with a relatively low height is removed from the channel part by an ashing process, and then the source/drain pattern of the channel part and the ohmic contact layer 48 are etched by the dry etching process. Hereby, the active layer 14 in the channel part is exposed and the source electrode 10 and the drain electrode 12 are separated.

Subsequently, the photoresist pattern existing on the source/drain pattern part is removed by a strip process.

For the material of the gate insulation film 44, an inorganic insulation material such as a silicon oxide (SiOx) or a silicon nitride (SiNx) is used. As a source/drain metal, molybdenum (Mo), titanium (Ti), tantalum (Ta), a molybdenum alloy, and so on can be used.

Referring to FIG. 3c, on the gate insulation film 44 where the source/drain patterns are formed, the protection film 50 including the first to the fourth contact holes (16, 24, 30, 38) is formed.

On the gate insulation film 44 where the source/drain patterns are formed, the protection film 50 is wholly formed by an evaporation method such as PECVD. The protection film 50 is patterned by a photolithography process and then etched using a third mask, thereby forming the first to the fourth contact holes (16, 24, 30, 38). The first contact hole 16 penetrates the protection film 50 and is formed so as to expose the drain electrode 12. The second contact hole 24 penetrates the protection film 50 and is formed so as to expose the storage electrode 22. The third contact hole 30 penetrates the protection film 50 and the gate insulation film 44 and is formed so as to expose the gate pad 28. The fourth contact hole 38 penetrates the protection layer 50 and is formed so as to expose the data pad 6.

For the protection film 50, an inorganic insulation material such as the gate insulation film 94 or an organic insulation material such as an acryl organic compound, BCB or PFCB having a low dielectric coefficient is used.

Referring to FIG. 3d, the transparent electrode patterns are formed on the protection film 50.

The transparent electrode material is wholly evaporated on the protection film 50 by the evaporation method such as the sputtering. Subsequently, by the photolithography process and the etching process using the fourth mask, the transparent electrode material is patterned, forming the transparent electrode pattern including the pixel electrode 18, the gate pad protection electrode 32, and the data pad protection electrode 40. The pixel electrode 18 is electrically connected to the drain electrode 12 through the first contact hole 16 and is electrically connected to the storage electrode overlapped with a prior stage gate line 2 through the second contact hole 24. The gate pad protection electrode 32 is electrically connected to the gate pad 28 through the third contact hole 30. The data pad protection electrode 40 is electrically connected to the data pad 36 through the fourth contact hole 38.

A transparent electrode material, such as an Indium Tin Oxide (ITO), Tin Oxide (TO), or Indium Zinc Oxide (IZO) is used. The thin film transistor substrate and the manufacturing method described above can decrease the number of steps in the manufacture process by adopting a 4-mask process rather than a 5-mask process. In addition, it can decrease the manufacturing cost proportionately. But since the manufacture process of the 4-mask process is complicated and possible cost reduction is limited, the thin film transistor substrate and a manufacturing method thereof is required that is further reduces the manufacture cost by further of simplifying the manufacture process.

Moreover, the pad part open process of the related art thin film transistor array substrate is carried out by the photolithography process. Accordingly, there is a problem in that the fabrication process is complicated and the material cost is high.

SUMMARY OF THE INVENTION

Accordingly, the present invention provides a fabrication method a liquid crystal display panel capable of simplifying a substrate structure and a fabrication process that substantially obviates one or more of the problems due to limitations and disadvantages of the related art.

In order to achieve these and other objects of the invention, the fabrication method of the liquid crystal display panel according to an aspect of the present invention includes: forming a thin film transistor at every region formed by the intersection of a gate line and a data line formed on a substrate, a pixel electrode, and a substrate including a plurality of thin film transistor array substrates having a gate pad part including a gate pad connected to the gate line and a data pad part including a data pad connected to the data line; arranging a cutting-off plate on a rest region of the substrate except for the pad part; and exposing the gate pad of the pad part and the data pad protection electrode by a etching process using the cutting-off plate.

Assembling a thin film transistor array substrate and a color filter array substrate where the gate pad and the data pad protection electrode are exposed, is included as well.

The cutting-off plate is made of a metal.

Forming the thin film transistor array substrate comprises: forming a gate pattern including a gate electrode of the thin film transistor, a gate line connected to the gate electrode, and a gate pad connected to the gate line on the substrate by use of a 1-mask process; forming a gate insulation film on the substrate where the gate pattern is formed; forming a source electrode and a drain electrode of the thin film transistor, a data line connected to the source electrode, a data pad connected to the data line, a source/drain pattern including a storage electrode in a region overlapped with the gate line, a semiconductor pattern formed in the lower part according to the source/drain pattern on the gate insulation film by use of a second masking process; and forming a pixel electrode connected to the drain electrode and the storage electrode, a transparent electrode pattern including a data pad protection electrode formed for covering the data pad, and a insulation film on the substrate where the transparent electrode pattern is formed by a third masking process.

The step of exposing the gate pad of the gate pad part comprises the step of removing the insulation film and the gate insulation part formed in the gate pad part by use of dry etching process.

The step of exposing the data pad protection electrode of the data pad part comprises the step of removing the insulation film formed on the data pad part, and the gate insulation film not overlapped with the data pad protection electrode by dry etching process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 10a to 10d are sectional views sequentially illustrating a fabrication method of a thin film transistor array substrate as shown in FIG. 9.

DETAILED DESCRIPTION OF THE ILLUSTRATED EMBODIMENTS

Reference will now be made in detail to an embodiment of the present invention, examples of which are illustrated in the accompanying drawings.

Hereinafter, with reference to FIGS. 4 to 11, the embodiments of the present invention will be explained.

Figure 1:
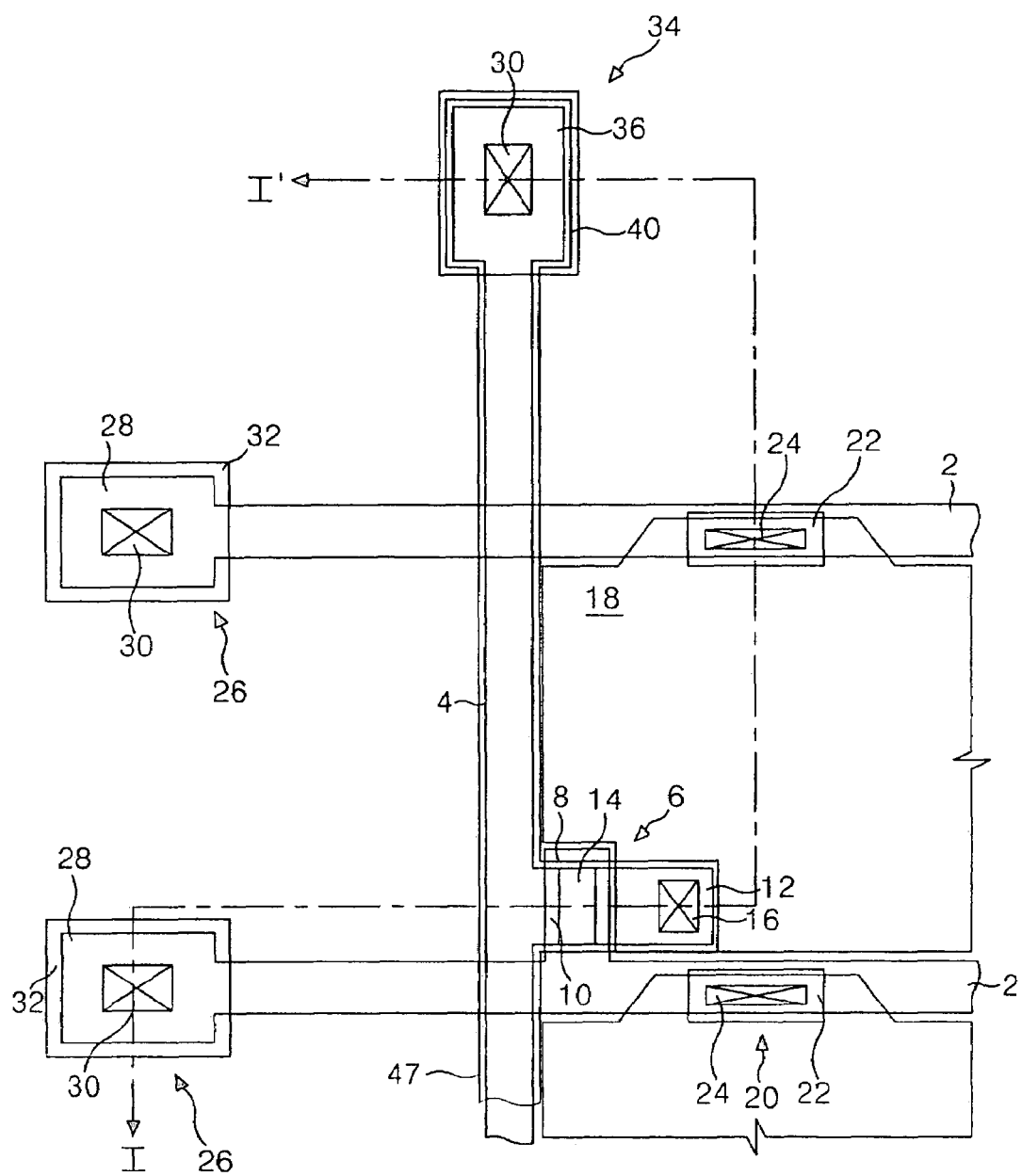
FIG. 1 is a plane view illustrating a portion of a thin film transistor array substrate included in a general liquid crystal display panel.
Figure 2:
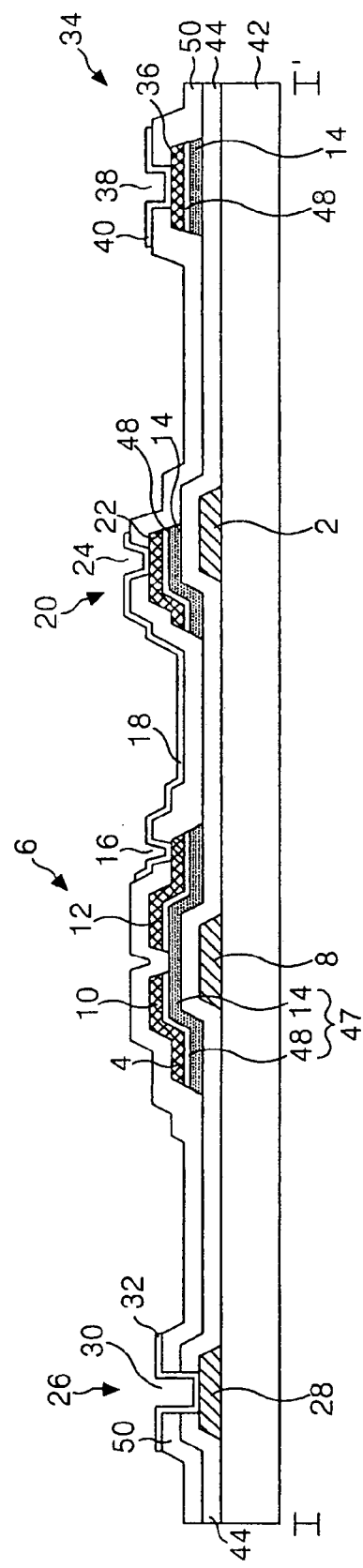
FIG. 2 is a sectional view illustrating taken along line I-I' a thin film transistor array substrate as shown in FIG. 1.
Figure 3A:
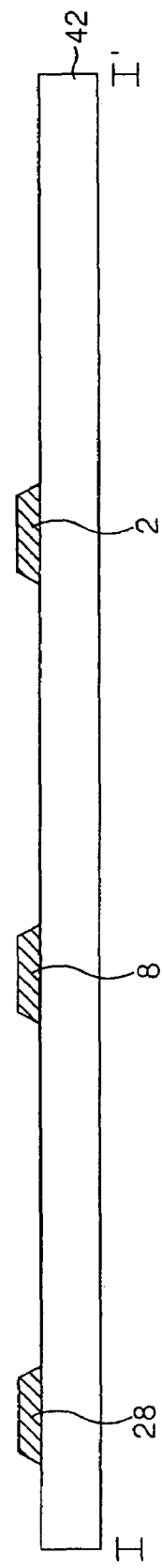
FIGS. 3a to 3d are sectional views illustrating a thin film transistor array substrate as shown in FIG. 2.
Figure 3B:
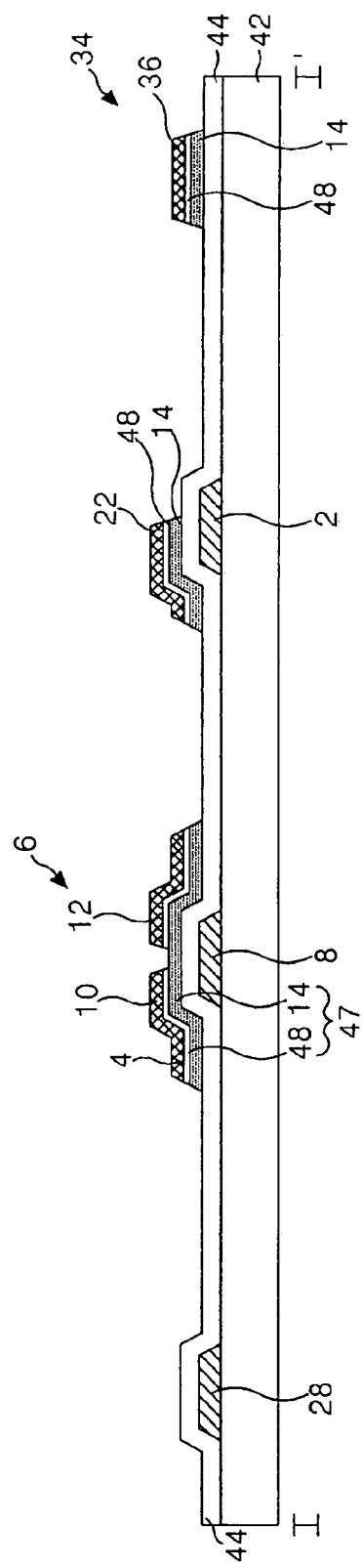
Figure 3C:
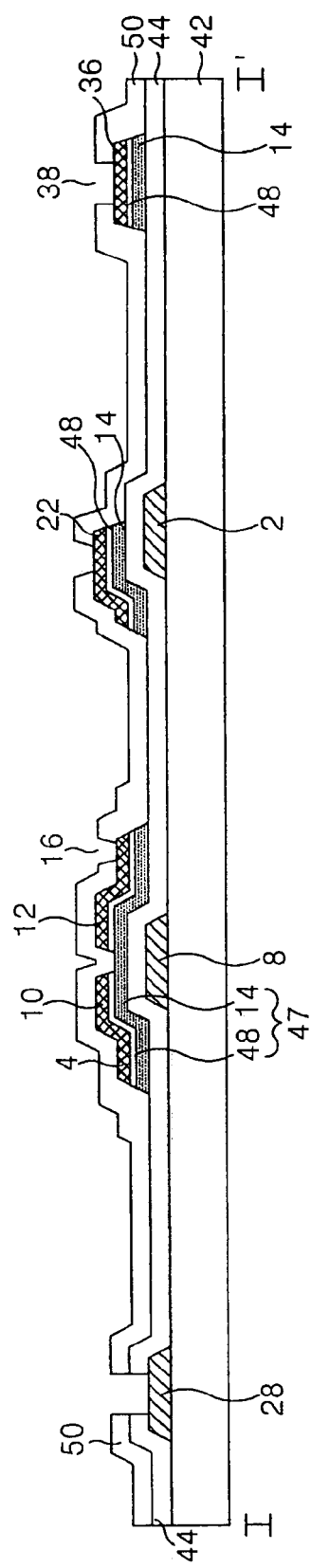
Figure 3D:
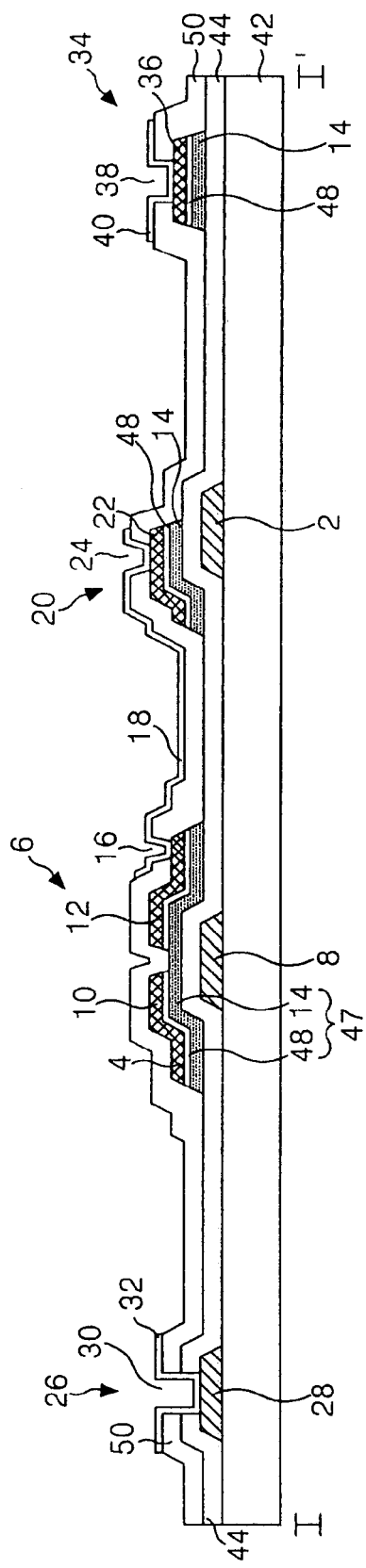
Figure 4:
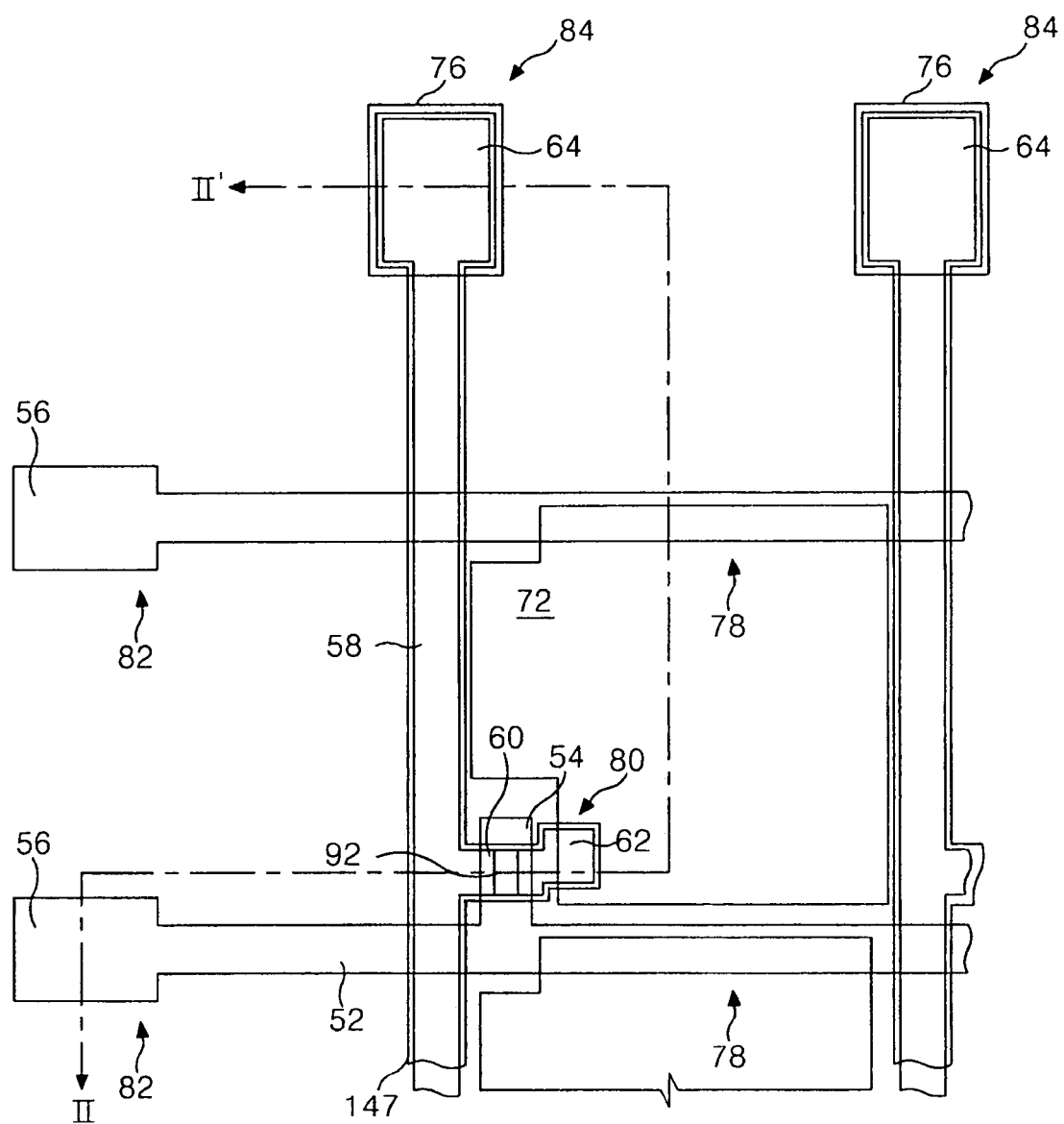
FIG. 4 is a plane view illustrating a thin film transistor array substrate included in a liquid crystal display panel according to a first embodiment of a present invention.
Figure 5:
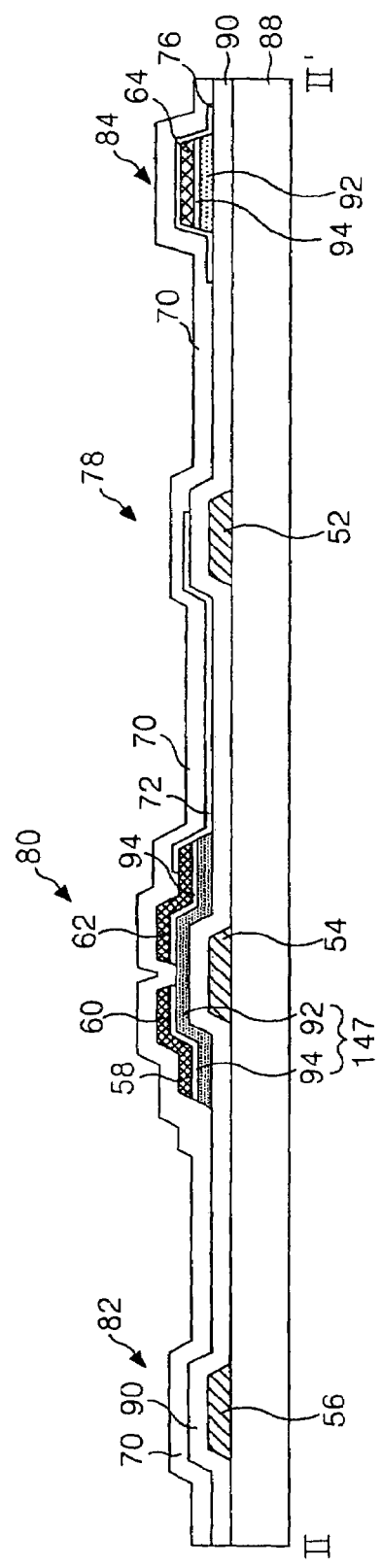
FIG. 5 is a sectional view illustrating taken along line II-II' a thin film transistor array substrate as shown in FIG. 6.

FIG. 4 is a plane view illustrating a thin film transistor array substrate according to the first embodiment of the present invention, and FIG. 5 is a sectional view illustrating a thin film transistor array substrate as shown in FIG. 4 taken along line II-II'.

The thin film transistor array substrate as shown in FIG. 4 and FIG. 5 comprises a gate line 52 crossing a data line 58, a gate insulation film 90 at interval on a lower substrate 88, a thin film transistor 80 formed at every intersection, and a pixel electrode 72 formed in the cell region bounded by the crossing lines. And the thin film transistor array substrate comprises a storage capacitor 78 formed at the overlapped part of a prior stage gate line 52, a gate pad part 82 connected to a gate line 52, and a data pad part 84 connected to a data line 58.

The thin film transistor 80 comprises a gate electrode 54 connected to the gate line 52, a source electrode 60 connected to the data line 58, a drain electrode 62 connected to the pixel electrode 72, and a semiconductor pattern 147 including an active layer 92 forming a channel 70 between the source electrode 60 and the drain electrode 62 and being overlapped by putting a distance between the gate electrode 54 and a gate insulation pattern 90. The thin film transistor 80 like this responds to a gate signal supplied to the gate line 52 and causes a pixel voltage signal supplied to the data line 58 to provide a steady charge to the pixel electrode 72.

The semiconductor pattern 147 includes a channel part between the source electrode 60 and the drain electrode 62 and is overlapped with the source electrode 60, the drain electrode 62, the data line 58 and the data pad 64. The semiconductor pattern 147 further comprises a source electrode 60, a drain electrode 62, a data line 58, a data pad 64, and an ohmic contact layer 66 formed for an ohmic contact on the active layer 92. The semiconductor pattern 147 including the active layer 92 and the ohmic contact layer 94 puts the gate insulation film 90 at interval and is formed overlapping in accordance with the gate line 52 and is formed separately between a cell and a cell, namely between the data line 58 and the data line 58. Hereby, it is possible to prevent the signal interference among cells due to the semiconductor pattern including the active layer 92 and the ohmic contact layer 94.

The pixel electrode 72 is connected to the drain electrode of the thin film transistor 80. The pixel electrode 72 generates voltage difference from common electrode formed on the upper substrate (not shown) when a pixel voltage is charged. By this voltage difference the liquid crystal located between the thin film transistor substrate and the upper substrate rotates due to dielectric anisotropy and makes incident light through the pixel electrode 72 from light source (not shown) penetrate to the upper substrate.

The storage capacitor 78 comprises a gate line 52 and the gate insulation film 90. The storage capacitor 78 like this makes the pixel voltage charged to the pixel electrode 72 steady until next pixel voltage is charged.

The gate line 52 is connected to a gate driver (not shown) through gate pad part 82. The gate pad part 82 comprises the gate pad 56 extended from the gate line 52 and on the gate pad 56 the gate insulation film 90 and the protection film 70.

The data line 58 is connected to the data driver (not shown) through the data pad part 84. The data pad part 84 comprises the data pad 64 extended from the data line 58, the data pad protection electrode connected to the data pad 64, the protection film 70 covering the data pad 60, the gate insulation film 90 formed between the data pad 64 and the lower substrate 88, the active layer 92, and the ohmic contact layer 94.

The thin film transistor array substrate having this constitution and included in the liquid crystal display panel is formed by the 3-mask process. The fabrication method of the liquid crystal display panel according to the embodiment of the present invention using the 3-mask process comprises a first masking process for forming gate patterns, a second masking process for forming a semiconductor pattern and the source/drain pattern, and a third masking process for forming the transparent electrode patterns and the protection film.

FIGS. 6a to 6e are plane views sequentially illustrating the thin film transistor array substrate manufacture method according to an embodiment of the present invention.

Figure 6A:
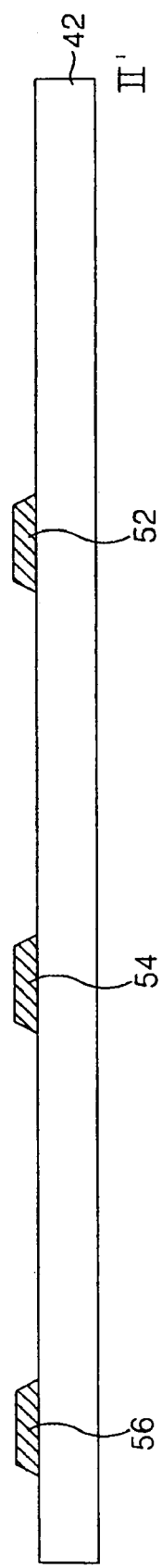
FIGS. 6a to 6d are sectional views illustrating step by step a fabrication method of a thin film transistor array substrate as shown in FIG. 5.

Referring to FIG. 6a, for the gate pattern on the lower substrate 88, the gate metal layer is formed by an evaporation method such as sputtering on the lower substrate 88. Subsequently, by the photolithography process and the etching process using the first mask the gate metal layer is patterned. And then the gate patterns including the gate line 52, the gate electrode 54, and the gate pad 56 are formed. As a gate metal, Cr, MoW, Cr/Al, Cu, Al(Nd), Mo/Al, Mo/Al(Nd), Cr/Al(Nd) and so on are used by a single layer or a double layer structure.

Figure 6B:
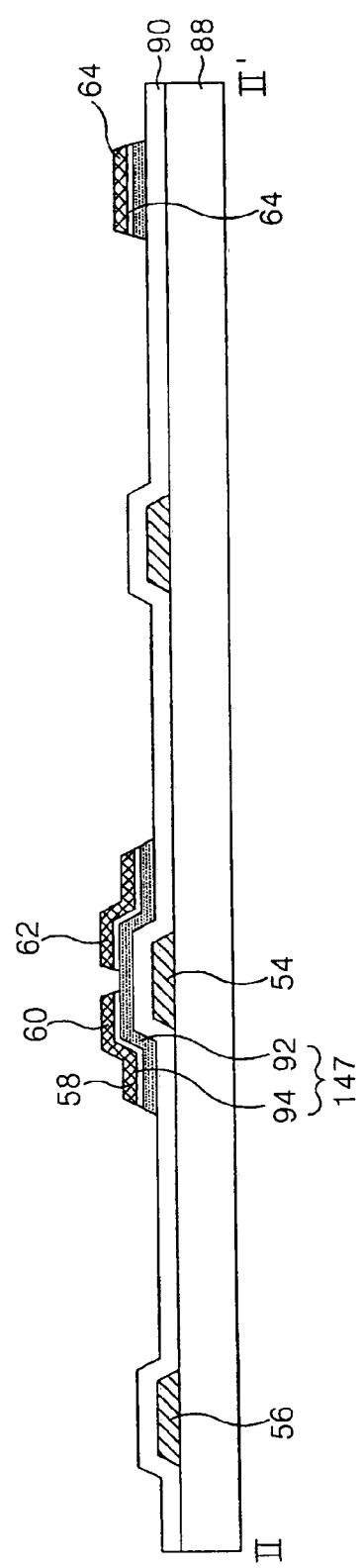

Referring to FIG. 6b, on a lower substrate 88 having the gate patterns formed, the gate insulation film 90 is formed and above that the semiconductor pattern and the source/drain patterns are stacked by the second mask process.

On the lower substrate 88 where the gate patterns are formed, by the evaporation method such as PECVD, sputtering or the like, the gate insulation film 90, an amorphous silicon layer, a n+ amorphous silicon layer, and a data metal layer are sequentially formed.

On the source/drain metal layer, the photoresist pattern is formed by the photolithography process using the second mask. In this case, as the second mask, by means of using the diffraction photo mask having the diffraction photo part corresponding to the channel part of the thin film transistor, the photoresist pattern of the channel part has a lower height than the other data pattern part.

Subsequently, as wet etching process by use of photoresist pattern, the source/drain metal layer is patterned and so the source/drain patterns including the data line 58, the source electrode 60, the drain electrode 62 as a single body with the source electrode 60, and the data pad 64 are formed.

And then by the dry etching process using the same photoresist pattern, the n+ amorphous silicon layer and the amorphous silicon layer are simultaneously patterned and so the semiconductor pattern in accordance with the source/drain pattern, that is, the ohmic contact layer 94 and the active layer 92 are formed.

And in the channel part, after the photoresist pattern having relatively low height is removed by the ashing process, the source/drain pattern of the channel part and ohmic contact hole 94 are etched by the dry etching process. Hereby, the active layer 92 of the channel part is exposed and the source electrode 60 and the drain electrode 62 are separated.

Subsequently, the photoresist pattern existing on the source/drain pattern part is removed by the strip process.

As a material of the gate insulation film 90, an inorganic insulation material such as an silicon oxide (SiOx) or a silicon nitride (SiNx) is used. As a data line metal, molybdenum (Mo), titanium (Ti), tantalum (Ta), a molybdenum alloy, or the like is used.

Figure 6C:
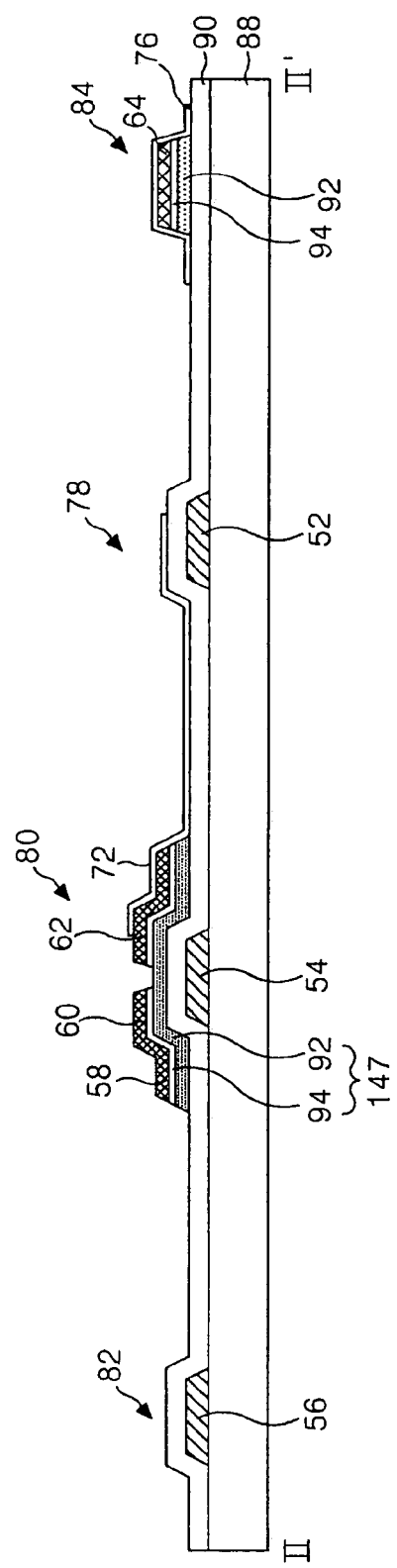

Referring to FIG. 6c, the transparent electrode pattern is formed by the 3-mask process. More specifically, on the gate insulation film 90 where the data pattern is formed, the transparent material is wholly evaporated by the evaporation method such as the sputtering. Subsequently, the transparent electrode material is patterned by the photolithography process and the etching process using the third mask, and so the pixel electrode 72 and the data pad protection electrode 76 is formed. The pixel electrode 72 is electrically connected to the drain electrode and the data pad protection electrode 76 is electrically connected to the data pad 64. As a pixel electrode material, Indium Tin Oxide (ITO), Tin Oxide (TO), or Indium Zinc Oxide (IZO) is used.

Figure 6D:
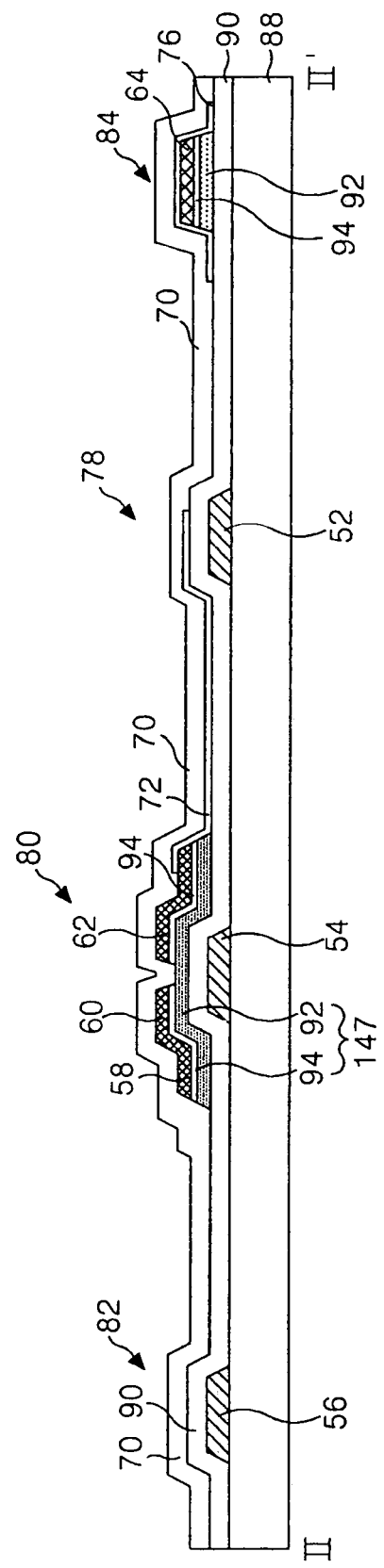

Then, as shown in FIG. 6d, the protection film 70 is wholly formed on the lower substrate 88. As a protection film 70, an inorganic insulation material such as SiNx, SiOx, an acryl organic compound of which dielectric constant is low, an organic insulation material such as BCB, PFCB is used.

Figure 6E:
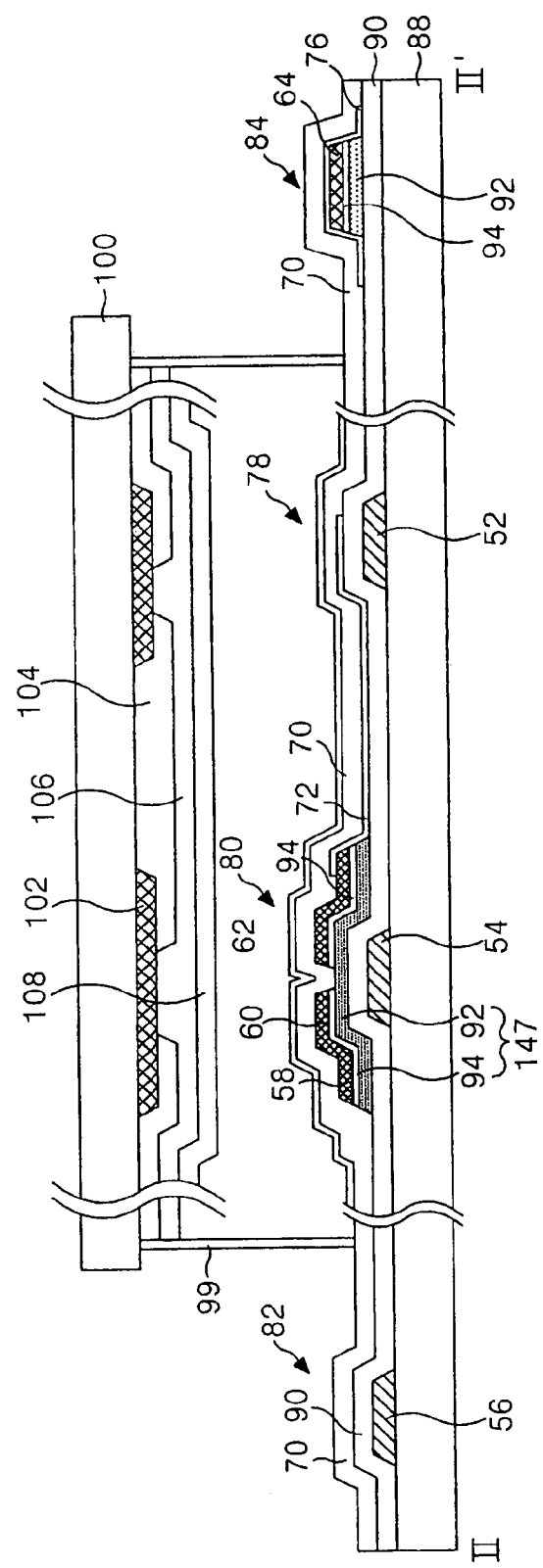
FIG. 6e is a sectional view illustrating a combination step of a color filter array and a thin film transistor array substrate as shown in FIG. 2.

Referring to FIG. 6e, the thin film transistor array substrate, to which a lower alignment film 17 is applied, is assembled with the color filter array substrate by use of a sealant 99. The color filter array substrate comprises a black matrix 102 formed in a matrix pattern on the upper substrate 100, a color filter 104 formed by cell region separated by the black matrix 102, a common electrode 106 stacked sequentially on the black matrix 102 and the color filter 104, and an upper alignment film 108.

Figure 7:
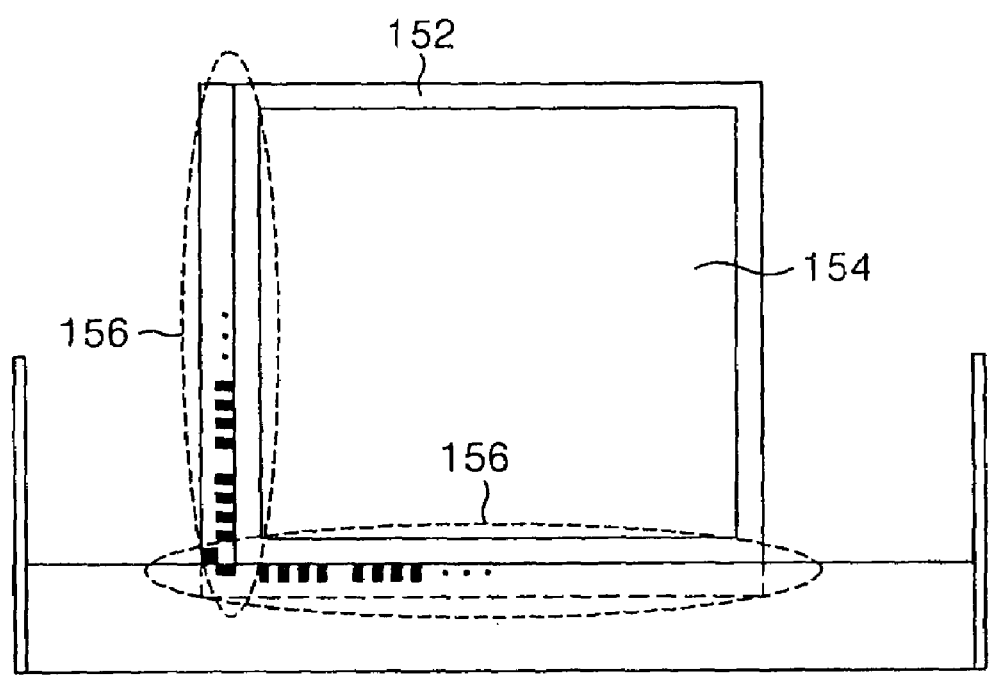
FIG. 7 is a sectional view illustrating a step of dipping a pad part in an etching liquid in order to open the pad part of a liquid crystal display panel.

On the other hand, a typical liquid crystal display panels is divided into a plurality of liquid crystal display panel by a scribing process after a plurality of the thin film transistor array substrates are formed on the lower substrate 88. The liquid crystal is injected into the separated liquid crystal display panel which, as shown in FIG. 7, are then dipped into the etching liquid, selectively exposing the pad part by use of the color array substrate as a mask.

After this pad part open process, if a degradation arises in the liquid crystal display panel, a problem exists that the material cost including the etching liquid for a pad open part of the liquid crystal display and liquid crystal injected between the color filter array substrates is wasted.

Figure 8:
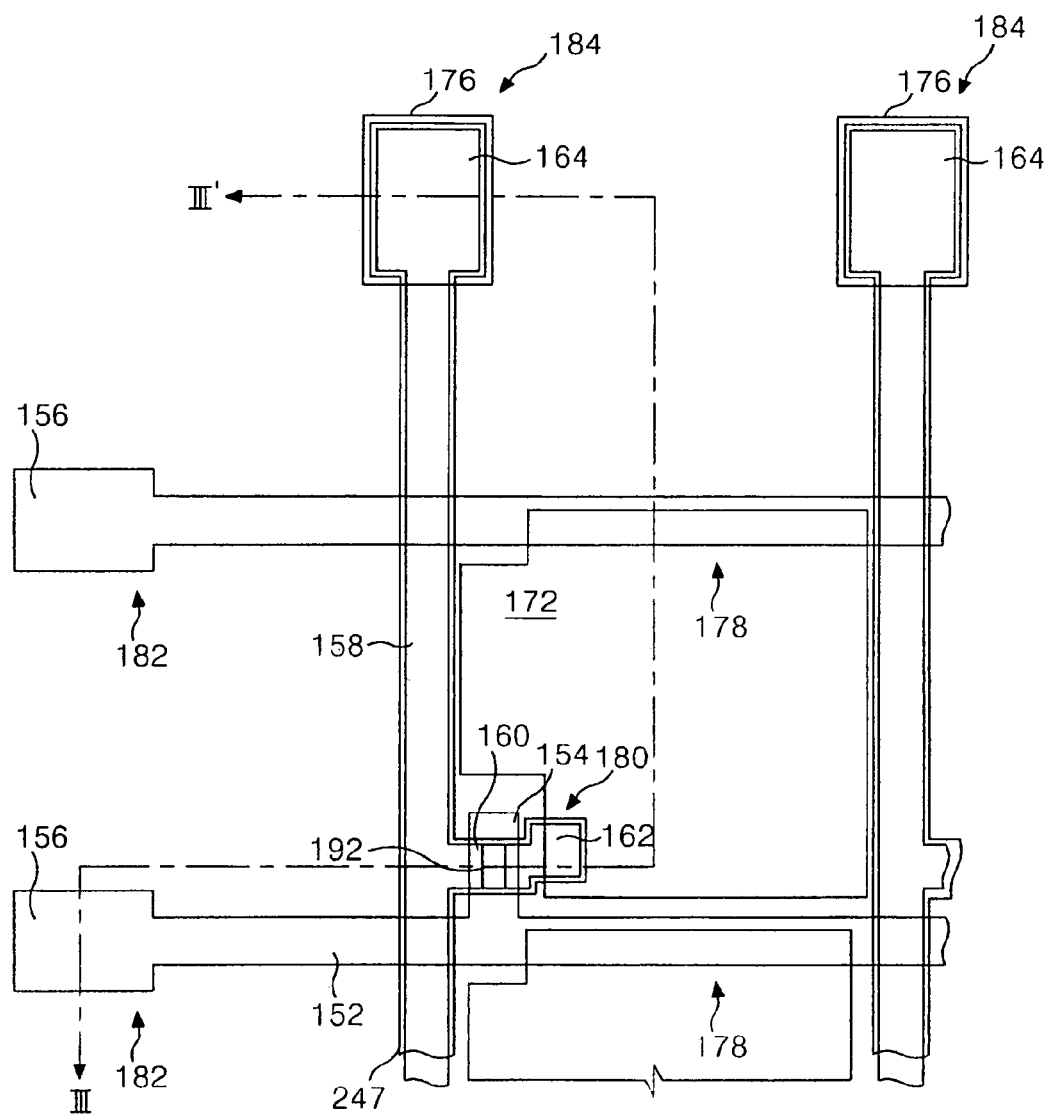
FIG. 8 is a plane view illustrating a thin film transistor array substrate included in a liquid crystal display panel according to a second embodiment of a present invention.
Figure 9:
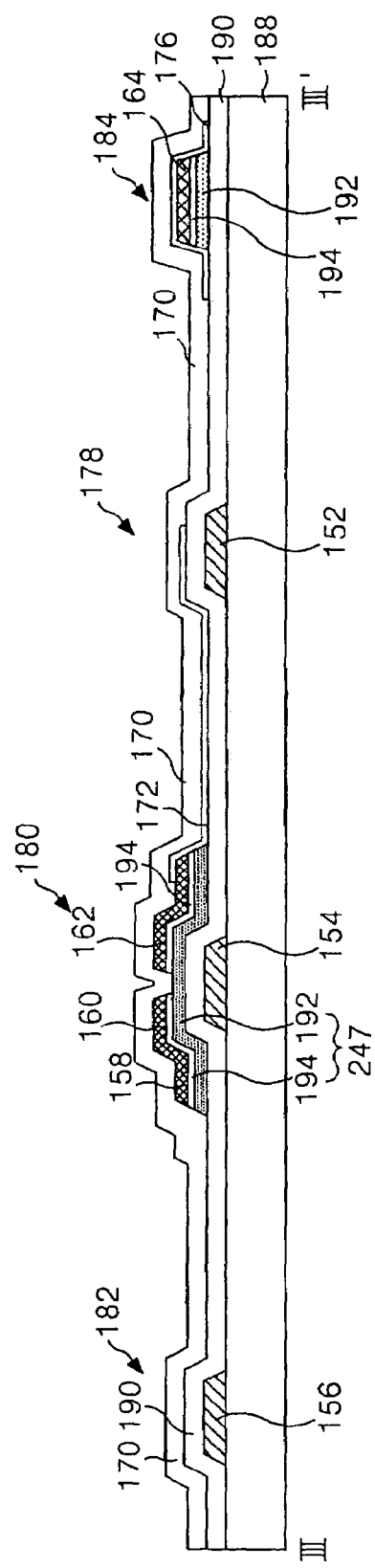
FIG. 9 is a sectional view illustrating taken along line III-III' a thin film transistor array substrate as shown in FIG. 8.

FIG. 8 is a plane view illustrating a thin film transistor array substrate included in a liquid crystal display panel according to a second embodiment of a present invention, and FIG. 9 is a sectional view illustrating a thin film transistor array substrate as shown in FIG. 8 taken along line III-III'.

The thin film transistor array substrate as shown in FIG. 8 and FIG. 9 comprises a gate line 152 crossing a data line 158 and having a gate insulation film 190 at intervals on a lower substrate 188. A thin film transistor 180 is formed at every crossing, and a pixel electrode 172 is formed in the cell region arranged by the crossing structure. The thin film transistor array substrate comprises a storage capacitor 178 formed at the overlapping part of a previous gate line 152, a gate pad part 182 connected to a gate line 152, and a data pad part 184 connected to a data line 158.

The thin film transistor 180 comprises a gate electrode 154 connected to the gate line 152, a source electrode 160 connected to the data line 158, a drain electrode 162 connected to the pixel electrode 172, and a semiconductor pattern including an active layer 192 forming a channel 170 between the source electrode 160 and the drain electrode 162 and being overlapped as putting at interval the gate electrode 154 and a gate insulation pattern 190. The thin film transistor 180 like this responds to a gate signal supplied to the gate line 152 and causes a pixel voltage signal supplied to the data line 158 to remain as being charged to the pixel electrode 172.

The semiconductor pattern includes a channel part between the source electrode 160 and the drain electrode 162 and is overlapped with the source electrode 160, the drain electrode 162, the data line 158 and the data pad 164. The semiconductor pattern comprises further a source electrode 160, a drain electrode 162, a data line 158, a data pad 164, and an ohmic contact layer 166 formed for an ohmic contact on the active layer 192. The semiconductor pattern 147 including the active layer 192 and the ohmic contact layer 194 puts the gate insulation film 190 at interval and is formed overlapping in accordance with the gate line 152 and is formed separately between a cell and a cell, namely between the data lines 158. Hereby, the signal interference among cells by the semiconductor pattern including the active layer 192 and the ohmic contact layer 194 can be prevented.

The pixel electrode 172 is connected to the drain electrode of the thin film transistor 180. The pixel electrode 172 generates voltage difference from common electrode formed on the upper substrate (not shown) by charged pixel voltage. By this voltage difference the liquid crystal located between the thin film transistor substrate and the upper substrate rotates due to dielectric anisotropy and makes incident light through the pixel electrode 172 from light source (not shown) penetrate to the upper substrate.

The storage capacitor 178 comprises a previous gate line 152 and the gate insulation film 190. The storage capacitor 178 like this makes the pixel voltage charged to the pixel electrode 172 stably maintained until next pixel voltage is charged.

The gate line 152 is connected to a gate driver (not shown) through gate pad part 182. The gate pad part 182 comprises the gate pad 156 extended from the gate line 152 and on the gate pad 156 the gate insulation film 190 and the protection film 170.

The data line 158 is connected to the data driver (not shown) through the data pad part 184. The data pad part 184 comprises the data pad 164 extended from the data line 158, the data pad protection electrode connected to the data pad, the protection film 170 covering the data pad 160, the gate insulation film 190 formed between the data pad 164 and the lower substrate 188, the active layer 192, and the ohmic contact layer 194.

The thin film transistor array substrate having this construction and included in the liquid crystal display panel is formed by the 3 masking process. The fabrication method of the liquid crystal display panel according to this embodiment of the present invention using the 3-mask process comprises the first masking process for forming the gate patterns, the second masking process for forming the semiconductor pattern and the source/drain pattern, and the third masking process for forming the transparent electrode patterns and the protection film.

FIG. 10a to 10e are plane views illustrating step by step the thin film transistor array substrate manufacture method according to the second embodiment of the present invention.

Referring to FIG. 10a, for the gate pattern on the lower substrate 188 the gate metal layer is formed by the evaporation method, such as sputtering method on the lower substrate 188. Subsequently, by the photolithography process and the etching process using the first mask, the gate metal layer is patterned. And then the gate patterns including the gate line 152, the gate electrode 154, and the gate pad 156 are formed. As a gate metal, Cr, MoW. Cr/Al, Cu, Al(Nd), Mo/Al, Mo/Al(Nd), Cr/Al(Nd) and so on are used by the one layer or the double layer structure.

Figure 10B:
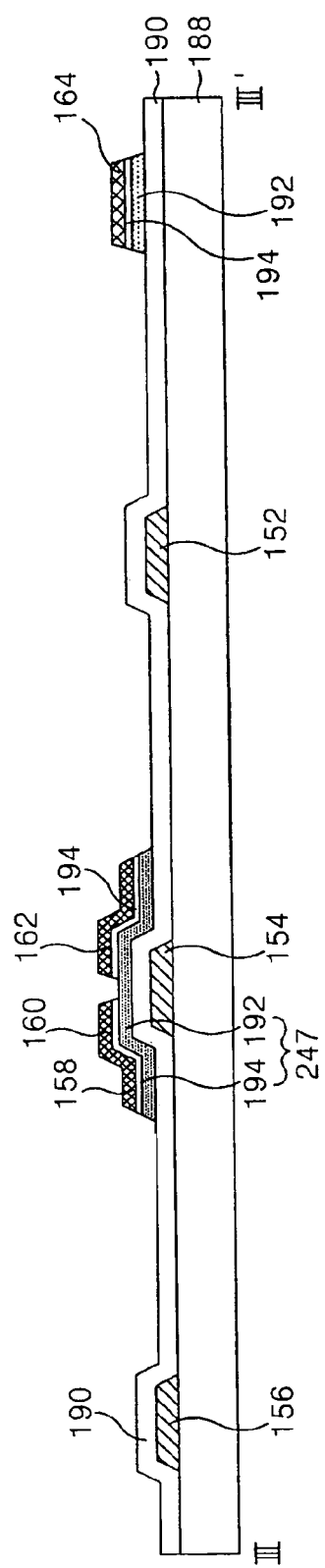

Referring to FIG. 10b, on the lower substrate 188 having the gate patterns formed, the gate insulation film 190 is formed and above that the semiconductor pattern and the source/drain patterns are stacked by the 2 masking process.

On the lower substrate 188 where the gate pattern are formed, by the evaporation method such as PECVD, sputtering, and so on, the gate insulation film 190, an amorphous silicon layer, a n+ amorphous silicon layer, and a data metal layer are formed sequentially.

The photoresist pattern is formed on the source/drain metal layer by the photolithography process using the second mask. In this case, as the second mask, by means of using the diffraction photo mask having the diffraction photo part corresponding to the channel part of the thin film transistor, the photoresist pattern of the channel part has lower height than the other data pattern part.

Subsequently, by wet etching process by use of photoresist pattern, the source/drain metal layer is patterned and so the source/drain patterns including the data line 158, the source electrode 160, the drain electrode 162 as a single body with the source electrode 160, and the data pad 164 are formed.

And then by the dry etching process using the same photoresist pattern, the n+ amorphous silicon layer and the amorphous silicon layer are patterned at the same time, and so the semiconductor pattern in accordance with the source/drain pattern that is, the ohmic contact layer 194 and the active layer 192 are formed.

And in the channel part, after the photoresist pattern having relatively low height is removed by the ashing process, by the dry etching process, the source/drain pattern of the channel part and ohmic contact hole 194 are etched. Hereby, the active layer 192 of the channel part is exposed and the source electrode 160 and the drain electrode 162 are separated.

Subsequently, by the strip process, the photoresist pattern existing on the source/drain pattern part is removed.

As a material of the gate insulation film 190, an inorganic insulation material such as an oxide silicon (SiOx) or a nitride silicon (SiNx) is used. As a data metal, a molybdenum (Mo), a titanium (Ti), a tantalum (Ta), a molybdenum alloy, and so on is used.

Figure 10C:
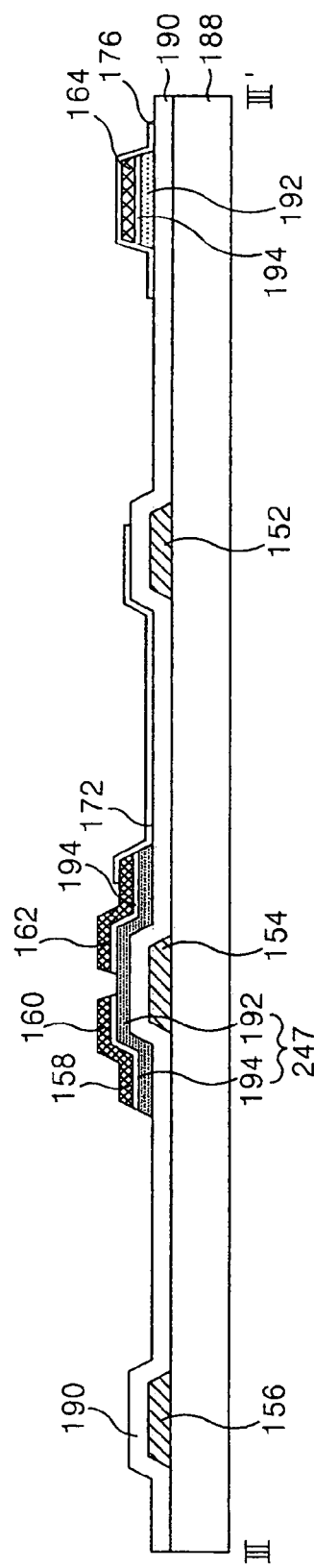

Referring to FIG. 10c, the transparent electrode pattern is formed by the 3-mask process. More specifically, on the gate insulation film 190 where the data pattern is formed, the transparent material is wholly evaporated by an evaporation method such as the sputtering. Subsequently, the transparent electrode material is patterned by the photolithography process and the etching process using the third mask and so the pixel electrode 172 and the data pad protection electrode 176 is formed. The pixel electrode 172 is connected to the drain electrode electrically. As a pixel electrode 172 and the data pad protection electrode 176 material, Indium Tin Oxide (ITO), Tin Oxide (TO), or Indium Zinc Oxide (IZO) any of it is used.

Figure 10D:
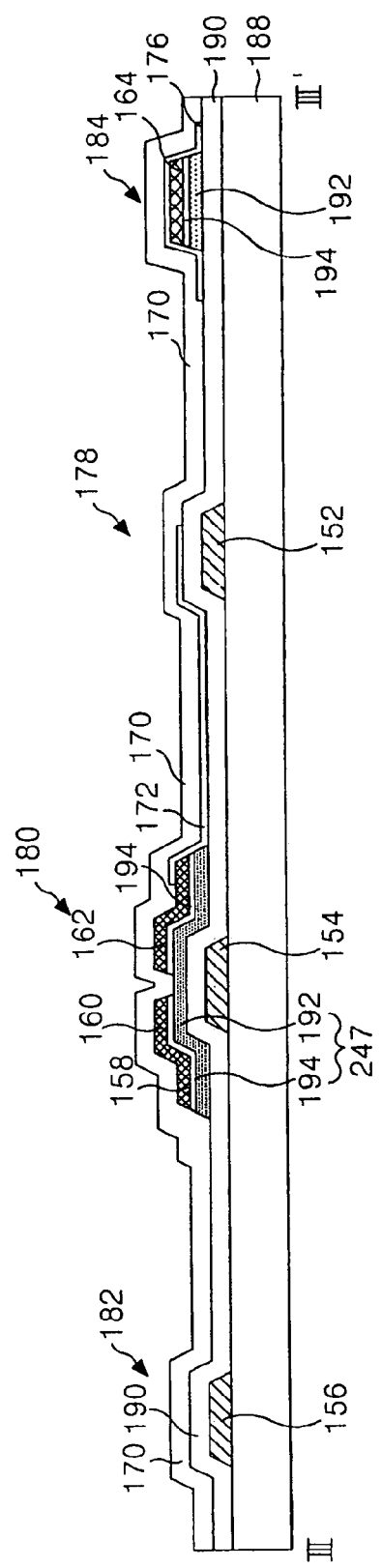

Then, as shown in FIG. 10d, the protection film 170 is wholly formed on the lower substrate 188. As a protection film 170, an inorganic insulation material such as SiNx, SiOx, an acryl organic compound of which dielectric constant is low, an organic insulation material such as BCB, PFCB is used.

Figure 11:
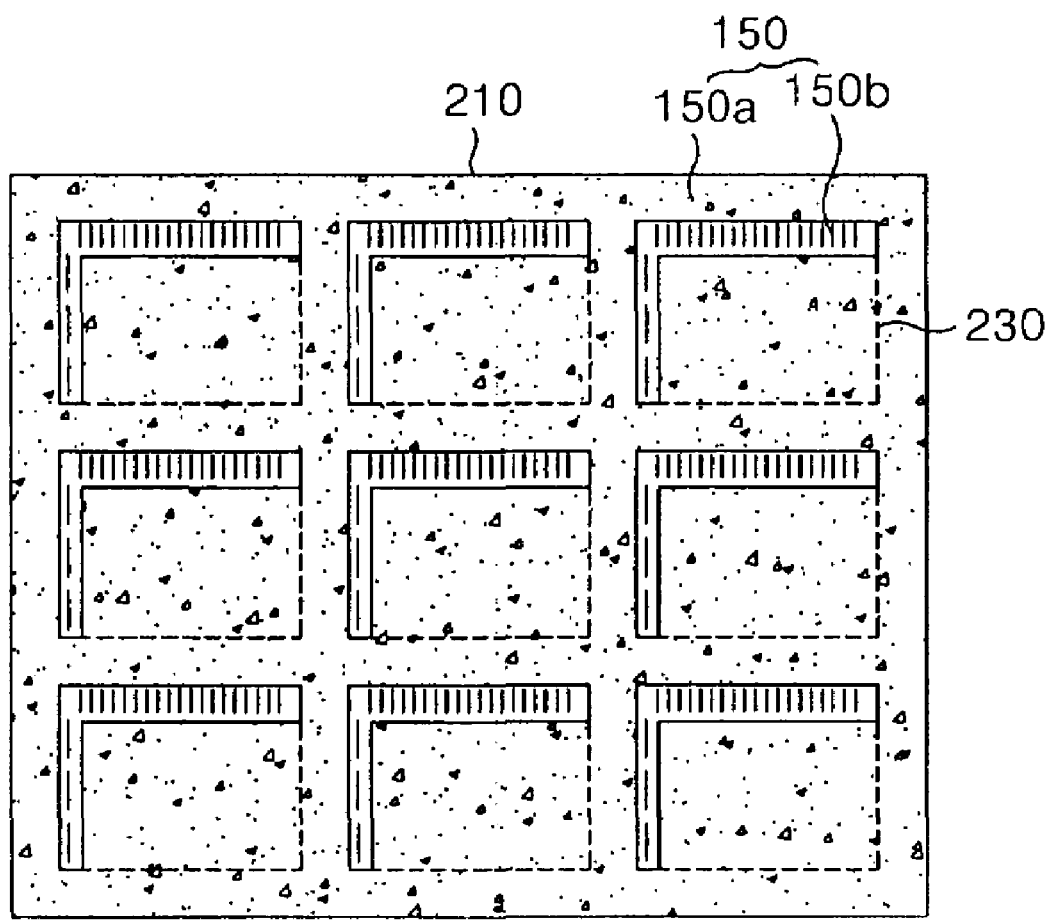
FIG. 11 is a plane view illustrating a pad part exposure step of a liquid crystal display panel according to a second embodiment of a present invention.
Figure 12:
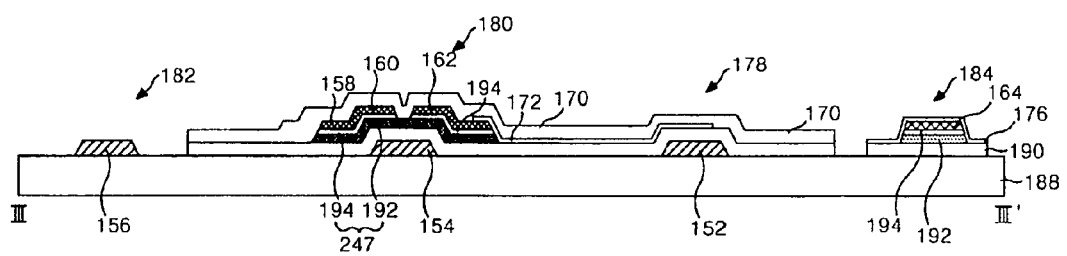
FIG. 12 is a sectional view illustrating gate and data pad parts exposure step of a liquid crystal display panel according to a second embodiment of a present invention.

Referring to FIG. 11, on the lower substrate 210 where a plurality of thin film transistor arrays 230 including the thin film transistor, the pixel electrode, the gate pad part, and the data pad part are formed, a cutting-off plate 150 are arranged as separated with the lower substrate 210 by a distance. The open region 150b located in the region overlapped with the pad part of the thin film transistor array substrate and a cutting-off-region 150a located and overlapped in the region except for the pad part are comprised. Here, the cutting-off region of the cutting-off plate 150 is formed by a metal other than molybdenum (Mo) capable of being etched along with the protection film and the insulation film in the dry etching process. The protection film and the gate insulation film exposed by use of such a cutting-off plate 150 are removed by the dry etching process, as shown in FIG. 12, and so the gate pad and the data pad protection electrode are exposed.

The lower substrate 210 where the gate pad and the data pad protection electrode are exposed like this becomes a plurality of thin film transistor array substrate by the scribing. Subsequently, the color filter array substrate and the thin film transistor array substrate (not shown) are assembled using the sealant. The color filter array substrate comprises a black matrix formed in a matrix pattern in the upper substrate, a color filter formed in cell region divided by the black matrix and an upper alignment film formed on the black matrix and the color filter.

After assembly process, the liquid crystal is injected between the color filter array substrate and the thin film transistor array substrate, and then the liquid crystal display panel is accomplished.

As described above, the liquid crystal display panel and the fabrication method of the same according to the present invention adopts a 3-mask process, which reduces the fabrication cost and improves the fabrication yield by means of further simplifying the substrate structure and the fabrication process.

Further, the liquid crystal display and the fabrication method of the same according to an embodiment of the present invention can reduce a material cost used in the photolithography process by means of opening the pad part by the dry etching process before an assembly of the thin film transistor array substrate and the color filter array substrate. Further, before the assembly, by means of carrying out the pad open process, the material cost of the etching liquid and the liquid crystal and so on by a degradation generated after the assembly can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A fabrication method of a liquid crystal display panel, comprising:
    forming a substrate including a plurality of thin film transistor array, the thin film transistor array having a thin film transistor at crossings of gate lines and data lines formed on a substrate, a gate pad part including a gate pad connected to the gate line and a data pad part including a data pad connected to the data line and a data pad protection electrode connected to the data pad;
    preparing a cutting-off plate having an opening region overlapped with the pad part of the substrate to expose the pad part of the substrate and a cutting-off region overlapped with a remainder part other than the pad part of the substrate, wherein the cutting-off plate of cutting-off region is formed by a metal other than molybdenum;
    arranging the cutting-off plate on the substrate so that the opening region overlaps with the pad part and the cutting-off region overlaps with the remainder part; and
    exposing entire surface of the gate pad and the data pad protection electrode of the pad part by a etching process using etching gas passing through opening region of the cutting-off plate without forming a photoresist pattern;
    wherein the step of forming the thin film transistor array substrate comprises the steps of:
    forming a gate pattern including a gate electrode of the thin film transistor, the gate line connected to the gate electrode and the gate pad connected to the gate line on the substrate by use of a first masking process;
    forming a gate insulation film on the substrate where the gate pattern is formed;
    forming a source electrode and a drain electrode of the thin film transistor, a data line connected to the source electrode, the data pad connected to the data line, a source/drain pattern including a storage electrode in a region overlapped with the gate line, a semiconductor pattern formed in the lower part according to the source/drain pattern on the gate insulation film by use of a second masking process;
    forming a transparent electrode pattern including a pixel electrode and the data pad protection electrode by use of a third masking process, the pixel electrode is directly connected to the drain electrode and the storage electrode, and the data pad protection electrode is formed for covering the data pad; and
    forming entirely a protection film on the substrate.

2. The fabrication method of the liquid crystal display panel according to claim 1, wherein a step of assembling a thin film transistor array substrate and a color filter array substrate where the gate pad and the data pad protection electrode are exposed, is further comprised.

3. The fabrication method of the thin film transistor panel according to claim 1, wherein the step of exposing the gate pad of the gate pad part comprises the step of removing the insulation film and the gate insulation part formed in the gate pad part by use of dry etching process.

4. The fabrication method of the thin film transistor panel according to claim 1, wherein the step of exposing the data pad protection electrode of the data pad part comprises the step of removing the insulation film formed on the data pad part and the gate insulation film not overlapped with the data pad protection electrode by dry etching process.

* * * * *